US008855312B1

(12) United States Patent
Hodgman et al.

(10) Patent No.: US 8,855,312 B1
(45) Date of Patent: Oct. 7, 2014

(54) MOBILE TRUST BROKER

(75) Inventors: Roy Hodgman, Wenham, MA (US);
Samir Saklikar, Mumbai (IN)

(73) Assignee: EMC Corporation, Hopkinton, MA (US)

( * ) Notice: Subject to any disclaimer, the term of this patent is extended or adjusted under 35 U.S.C. 154(b) by 117 days.

(21) Appl. No.: 13/537,617

(22) Filed: Jun. 29, 2012

(51) Int. Cl.
*G06F 21/00* (2013.01)

(52) U.S. Cl.
USPC ........ 380/270; 726/3; 726/6; 726/7; 713/155; 380/277; 380/278

(58) Field of Classification Search
CPC .................................................... H04L 9/0844
USPC ....................................................... 380/270
See application file for complete search history.

(56) References Cited

U.S. PATENT DOCUMENTS

| | | | |
|---|---|---|---|
| 7,500,262 B1 * | 3/2009 | Sanin et al. ....................... 726/2 |
| 8,509,844 B2 * | 8/2013 | Venkataramu .............. 455/552.1 |
| 8,553,885 B2 * | 10/2013 | Little et al. ..................... 380/270 |
| 2003/0026433 A1 * | 2/2003 | Matt ............... 380/278 |
| 2007/0116292 A1 * | 5/2007 | Kurita et al. ................... 380/270 |
| 2009/0119214 A1 * | 5/2009 | Delolme et al. ................ 705/44 |
| 2009/0187759 A1 * | 7/2009 | Marsico ......................... 713/155 |
| 2010/0088519 A1 * | 4/2010 | Tsuruoka et al. ............. 713/176 |
| 2010/0325713 A1 * | 12/2010 | Kurita et al. ....................... 726/7 |
| 2011/0165896 A1 * | 7/2011 | Stromberg et al. ........... 455/466 |
| 2012/0144468 A1 * | 6/2012 | Pratt et al. ........................ 726/7 |
| 2012/0178419 A1 * | 7/2012 | Facemire et al. ............. 455/411 |
| 2012/0264374 A1 * | 10/2012 | Perkins et al. ............... 455/41.1 |
| 2012/0266221 A1 * | 10/2012 | Castelluccia et al. ............. 726/6 |
| 2012/0276852 A1 * | 11/2012 | Gosset et al. ................ 455/41.2 |
| 2013/0024383 A1 * | 1/2013 | Kannappan ..................... 705/71 |
| 2013/0042305 A1 * | 2/2013 | Svendsen et al. ................. 726/3 |
| 2013/0067208 A1 * | 3/2013 | Brinkman et al. ................ 713/1 |
| 2013/0124855 A1 * | 5/2013 | Varadarajan et al. ......... 713/155 |
| 2013/0244615 A1 * | 9/2013 | Miller ........................... 455/411 |

OTHER PUBLICATIONS

Chappell, David, "Introducing Windows CardSpace", dated Apr. 2006, accessed from http://msdn.microsoft.com/en-us/library/aa480189.aspx on Jan. 15, 2014.
"FAQ", dated 2011, accessed from https://www.web.archive.org/web/20110830221107/http://www.google.com/wallet/faq.htm, on Jan. 15, 2014.
Dotan et al., "Authentication Involving Authentication Operations Which Cross Reference Authentication Factors," U.S. Appl. No. 13/434,257, filed Mar. 29, 2012, Unpublished.

(Continued)

*Primary Examiner* — Morshed Mehedi
(74) *Attorney, Agent, or Firm* — BainwoodHuang

(57) ABSTRACT

A method performed by a first computing device is disclosed. The method includes (a) establishing a proximity-based communications channel between the first computing device and a second computing device, one of the first device and the second device being a mobile device, (b) sending a request for authentication of identity of a remote entity from the first device to the second device, the remote entity being in possession of the second device, (c) receiving, at the first device, from the second device, an identity assertion that the remote entity is authentically identified by an identifier, the identity assertion's truth being conditional on a proximity-based condition, (d) verifying, at the first device, that the proximity-based condition is satisfied, and (e) in response to verifying, validating the identifier of the remote entity. An apparatus and computer program product for carrying out the method are also provided.

19 Claims, 4 Drawing Sheets

(56) References Cited

OTHER PUBLICATIONS

"Higgins project", Wikipedia, as edited by MrMorgana at 12:44 on Jun. 1, 2011, accessed from http://en.wikipedia.org/w/index.php?title=Higgins_project&oldid=431991892 on Jan. 15, 2014.

"Information Card", Wikipedia, as edited by Woohookitty at 12:07 on Dec. 15, 2011, accessed from http://en.wikipedia.org/w/index.php?title=Information_Card&oldid=465988808 on Jan. 15, 2014.

Bauer et al., "The Grey Project", dated Jun. 2, 2007, accessed from http://www.ece.cmu.edu/~grey/ on Jan. 15, 2014.

"SAML 2.0", Wikipedia, dated May 12, 2012, accessed from http://en.wikipedia.org/wiki/SAML_2.0 on Jun. 18, 2012.

"Security Assertion Markup Language", Wikipedia, dated Apr. 13, 2012, accessed from http://en.wikipedia.org/wiki/Security_Assertion_Markup_Language on Jun. 18, 2012.

* cited by examiner

MOBILE TRUST BROKER

BACKGROUND

When dealing with a new individual that one has never met, there are several conventional ways to determine the identity and credentials of the new individual. Some people rely on the new individual to present his name and credentials truthfully without need for verification. Others rely on an introduction by a trusted friend. Others examine documents presented by the individual, such as an identification card (e.g., license, passport, etc.), business card, badge, diploma, or certificate of membership in an organization.

Some advanced conventional systems utilize electronic badges. For example, a company may issue radio frequency identification (RFID) cards to employees, which emit a certain electromagnetic signal when in the presence of an RFID reader, in order to automatically determine if a person is an employee authorized to enter the company office protected by the RFID reader.

SUMMARY

Unfortunately, the above-described conventional approaches suffer from deficiencies. For example, relying on claims from a new individual regarding that individual's name and credentials without verification is often risky, since most people are not adept at recognizing lying behavior by individuals. As an additional example, relying on an introduction by a trusted friend is also risky, because the trusted friend may not be trustworthy, and the friend may also have been fooled by the new individual. As an additional example, examining documents presented by the new individual is also risky, since most people are not adept at recognizing forgeries. In addition, examining documents is unreliable because people sometimes neglect or forget to check the appropriate documents. In addition, examining documents is unreliable because documents can easily be lost or stolen and presented by imposters. As an additional example, using electronic badges is also unreliable because the electronic badges can also be lost or stolen and presented by imposters. This is especially true when the documents or badges are not often used by the owners, in which case a long delay may elapse between the time the documents or badges are lost or stolen and when the owners notice that they are missing. Thus, it would be desirable to have a system of identifying individuals and validating their credentials that does not suffer from these deficiencies In contrast to the above-described conventional approaches, embodiments disclosed herein are directed to techniques for validating identity claims made by entities and validating their credentials using one or more mobile devices and a proximity-based communications channel in order to verify an identity assertion made or signed by a trusted authority conditional on a particular contextual relationship existing between the first device and the second device, such as a proximity-based condition. In some embodiments, the trusted authority authenticates the entity using a knowledge-based or biometric technique prior to making an assertion. In some embodiments, the trusted authority cryptographically signs the assertion to avoid tampering. In some embodiments, the trusted authority or another trusted authority may also make an assertion of an attribute or authorization for the entity, the assertion being conditional on the identity of the entity in a similar manner.

In one embodiment, a method performed by a first computing device is disclosed. The method includes (a) establishing a proximity-based communications channel between the first computing device and a second computing device, one of the first device and the second device being a mobile device, (b) sending a request for authentication of identity of a remote entity from the first device to the second device, the remote entity being in possession of the second device, (c) receiving, at the first device, from the second device, an identity assertion that the remote entity is authentically identified by an identifier, the identity assertion's truth being conditional on a particular contextual relationship existing between the first device and the second device, (d) verifying, at the first device, that the particular contextual relationship is satisfied, and (e) in response to verifying, validating the identifier of the remote entity. In another embodiment, a method performed by a first computing device is disclosed. The method includes (a) establishing a proximity-based communications channel between the first computing device and a second computing device, one of the first device and the second device being a mobile device, (b) receiving, at the first device, from the second device, a request for authentication of identity of a user of the first device, (c) authenticating the user of the first device to a trusted authority, (d) receiving, at the first device, from the trusted authority, an identity assertion that the user of the first device is authentically identified by an identifier, the assertion being conditional on a particular contextual relationship existing between the first device and the second device, and (e) sending the identity assertion from the first device to the second device. Apparatuses and computer program products for carrying out these methods are also provided.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments disclosed herein are directed to techniques for validating identity claims made by entities and validating their credentials using one or more mobile devices and a proximity-based communications channel in order to verify an identity assertion made by a trusted authority conditional on a particular contextual relationship existing between the first device and the second device, such as a proximity-based condition. In some embodiments, the trusted authority authenticates the entity using a knowledge-based or biometric technique prior to making or signing an assertion. The trusted authority cryptographically signs the assertion to avoid tampering. In some embodiments, the trusted authority or another trusted authority may also make an attribute or authorization assertion conditional on the identity of the entity using similar techniques.

Figure 1:
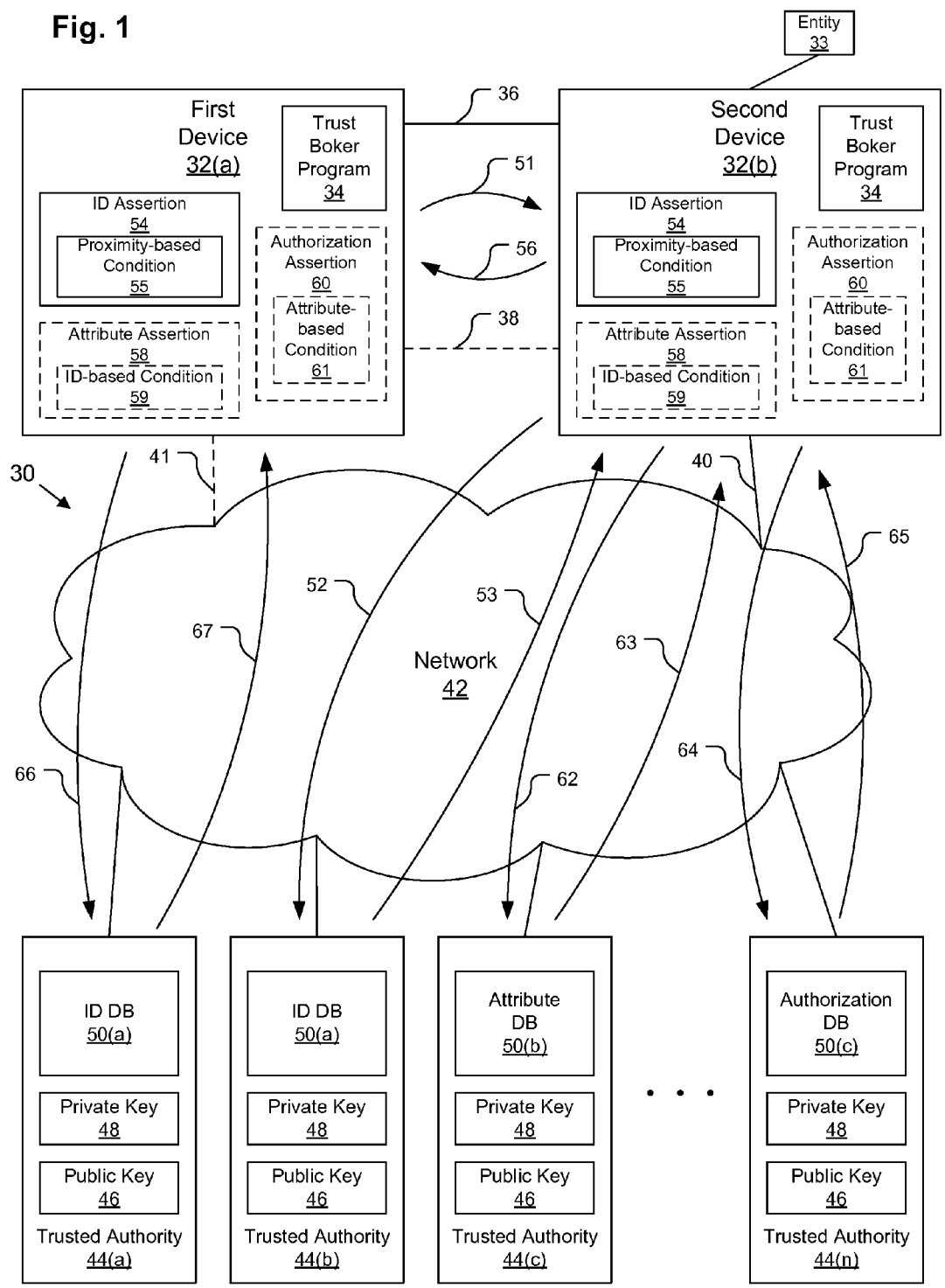
FIG. 1 illustrates an example system for use in conjunction with various embodiments.

FIG. 1 depicts an example system 30. System 30 includes two devices 32 (depicted as first device 32(a) and second device 32(b)). Devices 32 may be any kind of computing device configured to engage in communication via a proximity-based protocol, such as, for example, a personal computer, a desktop computer, a laptop computer, a workstation computer, a server computer, an enterprise system, a data storage system, a mobile device, a smart phone, a tablet computer, or a standalone integrated digital system. At least one of the two devices 32(a), 32(b) is a mobile device, such as a laptop computer, smart phone, or tablet computer. Second device 32(b) is in the possession of an entity 33. Entity 33 may be, for example, a person who owns the second device 32(b), a pet who is wearing the second device 32(b) as a pet identification device, or a landmark that is attached to the second device 32(b) in order to be reliably identified by a bystander.

Devices 32 each run a trust broker program 34 (or in some embodiments, devices 32 may implement the functionality of trust broker program 34 in hardware). A proximity-based communications channel 36 allows the two devices 32(a), 32(b) to communicate with each other. Proximity-based communications channel 36 may be, for example, a Near Field Communication (NFC) channel, which allows for low-bandwidth wireless electromagnetic (e.g., less than 1 Mbit/s) communication over a radio frequency, typically around 13.56 MHz. Proximity-based communications channel 36 should only allow devices to communicate when in close proximity (e.g., less than 20 cm from each other) in order to avoid eavesdropping and to uniquely identify the other device 32. NFC channels typically require a proximity of 4 cm or less, although, in some cases, a proximity of up 20 cm may work. NFC is a set of related technologies defined by standards such as ISO/IEC 18092/ECMA-340 and ISO/IEC 21481/ECMA-352 promulgated by the International Organization for Standardization, the International Electrotechnical Commission, and the Ecma International standards organization. The content and teachings of these standards are incorporated herein by reference in their entirety.

In some embodiments, a high-bandwidth communications channel 38 also allows the two devices 32(a), 32(b) to communicate with each other. High-bandwidth communications channel 38 may be, for example, a Bluetooth channel, which allows for high-bandwidth wireless electromagnetic (e.g., at least 1 Mbit/s) communication over a radio frequency, typically around 2.4 GHz. Bluetooth is defined by various specifications promulgated by the Bluetooth Special Interest Group of Kirkland, Wash. The content and teachings of all standards promulgated by the Bluetooth Special Interest Group as of the date of this Application are incorporated herein by reference in their entirety. In other embodiments, high-bandwidth communications channel 38 may be any other high-bandwidth wireless communication protocol allowing for point-to-point communication, such as, for example, the various Wi-Fi wireless networking standards defined by the various well-known IEEE 802.11 standards. In some embodiments, high-bandwidth communications channel 38 may be a TCP communications channel operating over any IP-based network, such as, for example the Internet, which devices 32 may connect to by any known technology, particularly any known cellular data transmission technology.

Second device 32(b) connects to a network 42 via an IP-based connection 40. Network 42 may be any kind of remote connection or network, such as, for example, a local area network, a wide area network, a storage area network, a point-to-point connection, a fabric of connections and switches, or the Internet. IP-based connection 40 may, for example, utilize Ethernet, Wi-Fi, or any known or anticipated cellular data transmission technology, such as TDMA, CDMA, GSM, EVDO, LTE, etc. In some embodiments, first device 32(a) also connects to network 42 via a similar IP-based connection 41.

Also connected to network 42 are a set of trusted authorities 44 (depicted as trusted authorities 44(a), 44(b), 44(c), . . . , 44(n)), which are servers capable of providing signed assertions over network 42. Each trusted authority 44 typically stores a private key 48, which it uses to encrypt or cryptographically sign assertions or certificates. Any entity having the corresponding public key 46 for the respective signing trusted authority 44 may verify the signature. The public keys 46 for the various trusted authorities 44 may be promulgated either by the trusted authorities themselves or via a central public key infrastructure server (not depicted) as is well-known in the art. Each trusted authority 44 represents a well-known entity that is generally-recognized as being trustworthy. Each trusted authority 44 stores a database 50, which stores information that allows that trusted authority 44 to make various assertions.

Certain trusted authorities (e.g., 44(a), 44(b)) provide identity assertions 54. These trusted authorities 44(a), 44(b) store an identification database 50(a), which stores a set of identifiers (e.g., names, identity numbers) and various information (e.g., passwords, biometric data, etc.) that allows that trusted authority 44(a), 44(b) to determine whether an entity properly identified by each identifier is to be identified by a properly-requested identity assertion 54. These trusted authorities 44(a), 44(b) are typically run by organizations such as governments and universities.

Certain trusted authorities (e.g., 44(c)) provide attribute assertions 58. These trusted authorities 44(c) store an attribute database 50(b), which stores a set of attributes (e.g., degrees conferred upon a person, positions of trust, certifications, etc.) in connection with respective identifiers of entities that posses the respective attributes. Thus, a university may store an attribute database 50(b) that associates degrees conferred by that university with the names or identification numbers of individuals who have been awarded those degrees, while a law-enforcement agency may store an attribute database 50(b) that associates law enforcement titles (e.g., police sergeant, police lieutenant, police chief, detective, traffic officer, etc.) for certain law enforcement agencies (e.g., particular police departments and various state and federal justice agencies) with the names or identification numbers of individuals currently employed in those positions. Similarly, an employment agency may store an attribute database 50(b) that associates job titles at various client companies with the names or identification numbers of individuals currently employed by those companies.

Certain trusted authorities (e.g., 44(n)) provide authorization assertions 60. These trusted authorities 44(c) store an authorization database 50(c), which stores a set of authorized actions that entities having certain identifiers or attributes are entitled to perform. Thus, authorization database 50(c) may indicate that all police officers and traffic officers in the state of Massachusetts are authorized to conduct a traffic stop of a vehicle within the state of Massachusetts. Similarly, authorization database 50(c) may indicate that all tow truck operators registered in the state of Vermont are authorized to tow vehicles within the state of Vermont. Similarly, an authorization database 50(c) run by the American Medical Association may indicate that all board-certified cardiac surgeons are authorized to perform heart surgery within the United States.

It should be understood that some trusted authorities 44 may contain multiple databases 50 in order to provide identity assertions 54, attribute assertions 58, and authorization assertions 60 or some combination thereof.

In some embodiments, the functionality of a trusted authority 44 may reside within a special tamper-resistant application running on one of the devices 32. This tamper-resistant application is one which is guaranteed not to be modified from its original programming. Thus, a trusted authority 44 running on one of the devices 32 may obtain identification information from a remote trusted authority 44 together with a certificate that certifies that the local trusted authority 44 is in possession of good identification data and that the local trusted authority 44 is secure from tampering and eavesdropping.

In operation, when first device 32(a) seeks to reliably determine the identity of entity 33 in control of second device 32(b), first device 32(a) sends an identification request 51 to second device 32(b). In some embodiments, request 51 is sent across proximity-based communications channel 36, while in other embodiments, request 51 is sent across high bandwidth communications channel 38 (which is typically secured by using a key agreed-upon over the proximity-based communications channel 36). In response to receiving the request 51, second device 32(b) sends an authentication request 52 to its associated ID Provider, which, as depicted, is trusted authority 44(b). Trusted authority 44(b) may engage in an authentication in order to prove that entity 33 is actually in control of second device 33. For example, trusted authority 44(b) may require that second device 32(b) send a username and password typed in by entity 33 in order to authenticate second device 32(b) as being under the control of entity 33. Upon the authentication procedure being satisfied, trusted authority 44(b) sends an authentication response message 53 containing an ID assertion 54 which provides an identifier (e.g. "Joe Smith") of entity 33, the truth of the ID assertion 54 being conditional on a proximity-based condition 55. For example, if first device 32(a) provided a session key to second device 32(b) over the proximity-based communications channel 36 (the proximity ensuring that there was no eavesdropper), the possession of the session key by second device 32(b) may serve as the proximity-based condition 55. As an additional example, a location (e.g., geographic coordinates) of second device 32(b) provided by second device 32(b) in the authentication request 52 may serve as the proximity-based condition 55. ID assertion 54 may be, for example, an XML-based assertion according to the Security Assertion Markup Language promulgated by the Organization for the Advancement of Structured Information Standards. Upon receiving the ID assertion 54, second device 32(b) sends an ID response 56 to first device 32(a). Trust broker program 34 of first device 32(a) is then able to evaluate whether the proximity-based condition 55 has been satisfied (e.g., by checking that the ID response 56 was received over high bandwidth communications channel 38 secured by the session key or by checking that the location of second device encoded within proximity-based condition 55 is within a certain maximum distance from the location of the first device 32(a)). If the proximity-based condition 55 is satisfied, then first device 32(a) can reliably ascertain that entity 33 is properly identified by the identifier ("Joe Smith").

In some embodiments, instead of using a proximity-based condition 55, the truth of the ID assertion 54 may, more generally, be conditional on a particular contextual relationship existing between the first device 32(a) and the second device 32(b). One example of a particular contextual relationship existing between the first device 32(a) and the second device 32(b) is a proximity-based condition 55, such as both the first device 32(a) and the second device 32(b) being co-located within a small geographic area. Another example of a particular contextual relationship existing between the first device 32(a) and the second device 32(b) is that both the first device 32(a) and the second device 32(b) are privy to information which is not expected to be known to any third party. An example of this is that if users of the first device 32(a) and the second device 32(b) conduct a telephone conversation with each other using these devices 32, the first device 32(a) and the second device 32(b) may each record the same conversation in a substantially similar way. Thus, voice processing and hashing techniques can be used to construct the same hash on both devices 32, the hash not being known to any other party. Thus, when second device 32(b) requests an ID assertion 54 from trusted authority 44(b), the second device 32(b) can request that the ID assertion 54 be made conditional on possession of the hash instead of proximity-based condition 55. Since only first device 32(a) and second device 32(b) (and, temporarily, trusted authority 44(b)) are in possession of the hash, when first device 32(a) receives the ID assertion 54, it can be sure that the signed assertion was requested by the second device 32(b), since it is conditional on the hash that is only known to those parties.

In some embodiments, when a trusted authority 44 resides on second device 32(b), ID assertion 54 may be made by the local trusted authority 44 running on second device 32(b). In such cases, the local trusted authority 44 will typically, at some point have received information from ID DB 50(a) concerning the second device 32(b) from trusted authority 50(b) to be securely stored locally within the tamper-resistant application of the local trusted authority 44. Local trusted authority 44 can be configured to only generate assertions in accordance with data securely stored locally and received from a trusted authority 44, such as trusted authority 44(b) and to prevent access to such data by third parties and unauthorized applications. Trusted authority 44(b) also, at some point, has provided the local trusted authority 44 running on second device 32(b) with a certificate containing a public key 46 for that local trusted authority 44, the certificate having been signed by the trusted authority 44(b), allowing first device 32(a) to trust that the local trusted authority 44 running on second device 32(b) is as trustworthy as trusted authority 44(b). It should be understood that a similar local trusted authority 44 may also run within a tamper-resistant application running on first device 32(a).

In some embodiments, instead of second device 32(b) storing only a single ID assertion 54, second device may store a plurality of ID assertions 54 about itself provided by multiple trusted authorities. Thus, second device 32(b) can provide multiple ID assertions to first device 32(a) in high security situations in which a particularly high degree of assurance about the identity of second device 32(b) is needed.

In some embodiments, in response to receiving the ID assertion 54, second device may also send an attribute request 62 to trusted authority 44(c) for an attribute assertion 58. Upon referencing the attribute DB 50(b), trusted authority 44(c) may send back an attribute response message 63 containing attribute assertion 58 which provides an attribute (e.g. "Over 21 years old") of entity 33, the truth of the attribute assertion 58 being conditional on an ID-based condition 59. For example, ID-based condition 59 may require that the entity 33 is identified by the identifier "Joe Smith." Second device may send attribute assertion 58 to first device 32(a) together with ID assertion 54 within ID response 56. In some embodiments, once attribute assertion 58 has once been received by second device 32(b), it is persistently stored in memory, and it may be sent in any future ID response 56.

In some embodiments, in response to receiving the attribute assertion 58, second device may also send an authorization request 64 to trusted authority 44(n) for an authorization assertion 60. Upon referencing the authorization DB 50(c), trusted authority 44(n) may send back an authorization response message 65 containing authorization assertion 60 which provides an action authorization (e.g. "May legally purchase alcohol") of entity 33, the truth of the authorization assertion 60 being conditional on an attribute-based condition 61. For example, attribute-based condition 61 may require that the entity possess an attribute of "Over 21 years old." Second device may send authorization assertion 60 to first device 32(a) together with ID assertion 54 within ID response 56. In some embodiments, once authorization assertion 60 has once been received by second device 32(b), it is persistently stored in memory, and it may be sent in any future ID response 56. In some embodiments, instead of the truth of the authorization assertion 60 being conditional on an attribute-based condition 61, the truth of the authorization assertion 60 is conditional on both an attribute-based condition 61 and an ID-based condition 59, while in other embodiments, the truth of the authorization assertion 60 is conditional only on an ID-based condition 59.

In some embodiments, ID request 51 may initiate a mutual ID exchange. In such embodiments, first device 32(a) also sends an authentication request 66 to its associated ID Provider (e.g., trusted authority 44(a)), which, upon authenticating a user of first device 32(a), sends back an authentication response message 67 containing an ID assertion identifying the user of first device 32(a).

Figure 2:
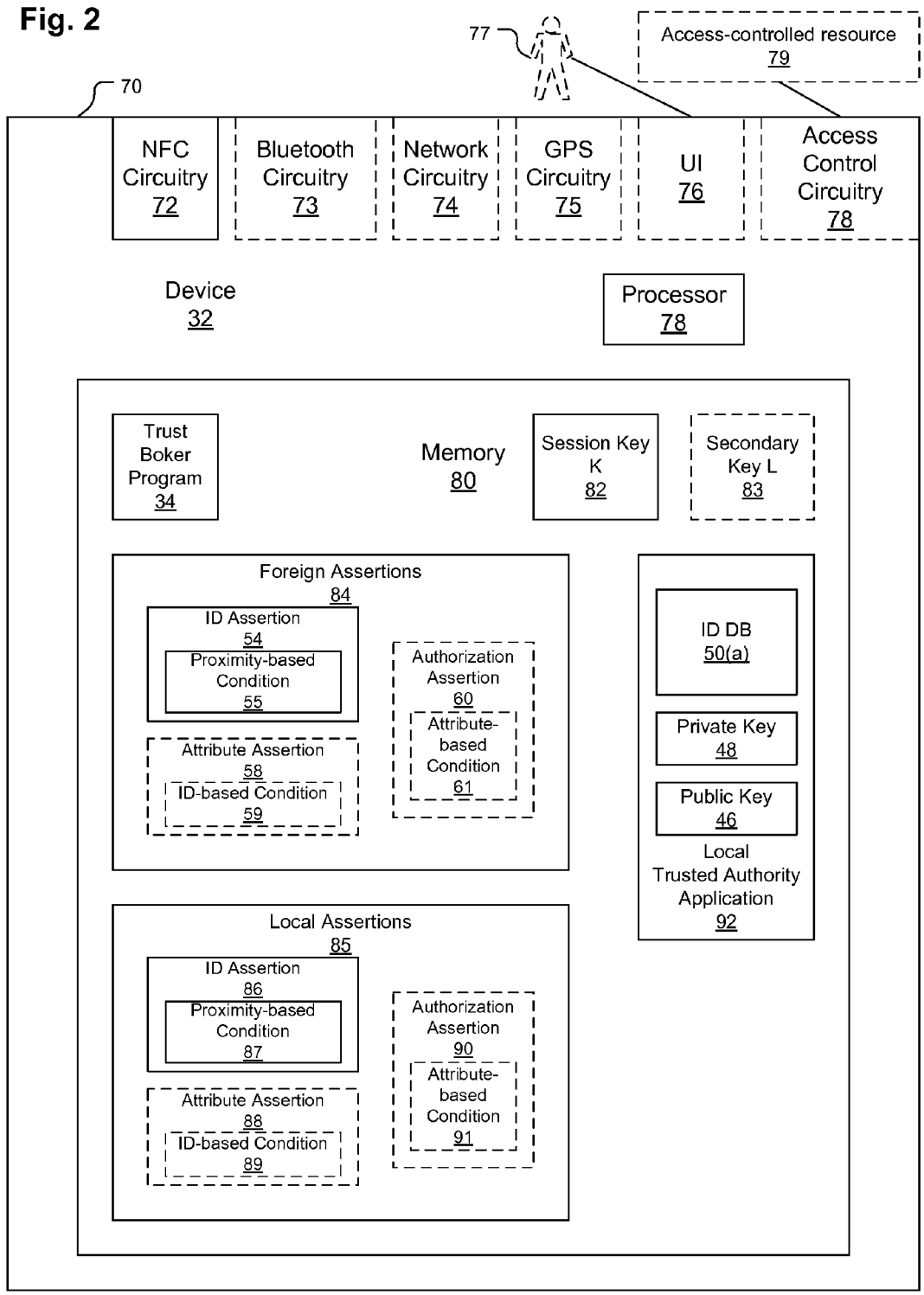
FIG. 2 illustrates an example apparatus according to various embodiments.

Further detail with respect to devices 32(a), 32(b) is provided in FIG. 2. FIG. 2 depicts an example device 32. Device 32 includes a chassis 70, which supports the other components of device 32. Device 32 also includes NFC circuitry 72 for connecting to proximity-based channel 36 (or circuitry for any proximity-based connection), processor 78, and memory 80. In some embodiments, device 32 also includes Bluetooth circuitry 73 for connecting to high bandwidth communications channel 38 (or circuitry for any high bandwidth communications connection), network circuitry 74 for connecting to network 42 (via connection 40, 41), Global Positioning System (GPS) circuitry 75 for ascertaining precise geographic coordinates by triangulating a position using signals from GPS satellites, user interface (UI) 76, and access control circuitry 78. UI 76 may include, for example, a display screen (e.g., a touch-sensitive display screen having a diagonal length between 2 inches and 18 inches) for displaying information to a user 77 in possession of device 32. In some embodiments, UI 76 also receives input from user 77. In the case of second device 32(b), user 77 is the entity 33. Access control circuitry 78 connects to an access-controlled resource 79 and controls access to the access-controlled resource 79. For example, if access-controlled resource 79 is a locked doorway, access control circuitry selectively locks and unlocks the doorway based on an action authorization provided by an authorization assertion 60 for another device 32 in proximity to the device 32 having the access control circuitry 78.

Processor 78 may be any kind of processing device for performing operations, such as, for example, a central processing unit, a microprocessor, a collection of multiple microprocessors, a digital signal processor, a field-programmable gate array, a collection of circuits configured to perform various operations, a storage processor, or another similar device or set of devices configured to perform operations.

Memory 80 may include, for example, system memory, cache memory, volatile memory, random access memory, non-volatile memory, flash memory, data storage devices, some combination thereof, or another similar device or set of devices configured to store running software and or data. Memory 80 stores executing and loaded code as well as associated data during execution, including an operating system (not depicted), various drivers and applications, session key K 82, a set of foreign assertions 84, a set of local assertions 85, and trust broker program 34, which, when executed by processor 78, performs one or more methods, as described below in connection with FIGS. 3 and 4. In some embodiments, memory 80 also stores a secondary key L 83. Set of foreign assertions 84 include assertions made about a remote device, including an ID assertion 54, and, in some embodiments one or more attribute assertions 58 and authorization assertions 60. Set of local assertions 85 include assertions made about the device 32 itself, such as an ID assertion 86 (based on condition 87), one or more attribute assertions 88 (based on condition 89) and authorization assertions 90 (based on condition 91).

In some embodiments, memory 80 also stores a local trusted authority application 92. Local trusted authority application 92 is a tamper-resistant application, which, when executed by processor 78, performs similar functionality as remote trusted authorities 44(a), 44(b).

Having described the various systems, apparatuses, and associated constructs of and used in conjunction with various embodiments, this Description will now turn to describing various method embodiments which may be performed in conjunction with the above-described systems, apparatuses, and associated constructs.

Figure 3:
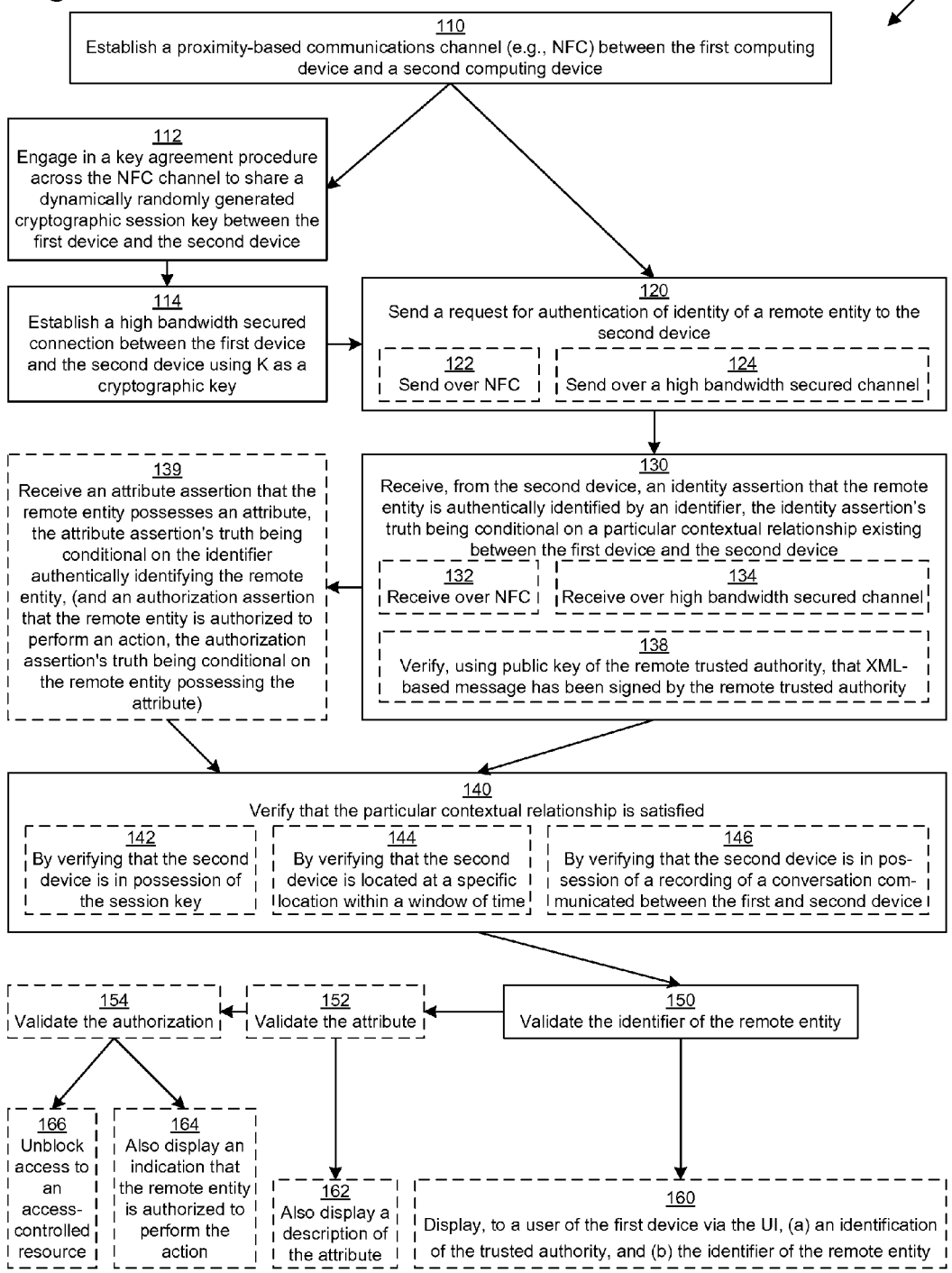
FIG. 3 illustrates an example method according to various embodiments.

FIG. 3 depicts an example method 100 performed by a first device 32(a). Method 100 is performed by processor 78 of first device 32(a) as it executes trust broker program 34, however, as shorthand, this execution will henceforth be described as being performed by trust broker program 34.

In step 110, first device 32(a) establishes proximity-based communications channel 36 (e.g., an NFC channel) between first device 32(a) and second device 32(b). The proximity of the devices 32 required to maintain the proximity-based communications channel 36 ensures both that the devices 32 are collocated within a small geographic area (e.g., within 20 cm of each other), and also reduces the likelihood that a third party is eavesdropping on the unsecured channel.

In step 120, trust broker program 34 sends ID request 51 to second device 32(b) for authentication of the identity of entity 33 in control of second device 32(b). In some embodiments, step 120 is performed by sending the ID request 51 over the NFC channel 36 (sub-step 122). In other embodiments, step 120 is performed by sending the ID request 51 over a secured high bandwidth communications channel 38 (sub-step 124). Typically, even in the case of sub-step 122, the NFC channel 36 is secured, although this is not strictly necessary due to the reduced likelihood of eavesdropping over the NFC channel 36.

In embodiments in which channel 36, 38 is secured, certain preliminary steps 112-114 are first performed. In step 112, trust broker program 34 engages in a key agreement procedure across the NFC channel 36 to share a dynamically randomly generated cryptographic session key, K, 82 between the first device 32(a) and the second device 32(b). In step 114, trust broker program 34 establishes a secured connection over high bandwidth communications channel 38 using session key, K, 82 as the cryptographic key for the secured channel.

In step 130, trust broker program 34 receives (either via secured NFC channel 36 in sub-step 132, or via secured high bandwidth communications channel 38 in sub-step 134), from second device 32(b), ID response message 56 containing an ID assertion 54 about entity 33 in control of second device 32(b). The truth of the ID assertion 54, if the ID assertion 54 is a verified assertion (see following paragraph), is governed by the particular contextual relationship existing between the first device 32(a) and the second device 32(b), such as proximity-based condition 55.

In some embodiments, in sub-step 138, the ID assertion 54 is located within an XML-based message that is signed by a trusted authority 44(b), and trust broker program 34 verifies that the XML-based message containing the ID assertion 54 has been digitally signed by trusted authority 44(b). Trust broker program 34 is able to make this verification using public key 46 of trusted authority 44(b) using well-known techniques. This step ensures that second device 32(b) has not tampered with the ID assertion 54.

In some embodiments, in optional step 139, trust broker program 34 also receives one or more attribute assertions 58 and authorization assertions 60 concerning entity 33 within ID response message 56. In some embodiments, digital signatures of these additional assertions 58, 60 are also verified as in sub-step 138 to ensure a lack of tampering.

In step 140, which is performed after step 130 (and, in some embodiments, also after step 139) trust broker program 34 verifies that the particular contextual relationship (e.g., proximity-based condition 55) is true. In some embodiments, in sub-step 142, trust broker program 34 accomplishes this trivially by verifying that the second device 32(b) is in possession of the session key, K 82. Obviously second device 32(b) is in possession of the session key, K 82 because otherwise the first device 32(a) and the second device 32(b) would not be able to communicate over the channel 36, 38 secured by K 82. Thus, what this verification really means is that the first device 32(a) verifies that the second device 32(b) has actually been in contact with the trusted authority 44(b) since the performance of step 112 to acquire they ID assertion 54 because the fact that the ID assertion 54 from trusted authority 44(b) is conditional on second device 32(b) possessing K 82 proves that trusted authority 44(b) only issued the ID assertion 54 in response to the current query. Thus, this prevents replay attacks. In some of these embodiments, possession of K 82 is established by trusted authority 44(b) as the proximity-based condition 55 by trusted authority 44(b) conveying within condition 55 a provable indication that it has knowledge of K 82.

In other embodiments, in sub-step 144, trust broker program 34 accomplishes verification of the proximity-based condition 55 by verifying that the second device 32(b) is located at a specific location specified within the proximity-based condition 55 within a short window of time, e.g., 1 minute. This short window may be established by setting an XML expiration field within the ID assertion 54 or within the condition 55. In some embodiments, the specific location is originally determined by GPS circuitry of the second device 32(b), sent to trusted authority 44(b) within authentication message 52 for inclusion within ID assertion 54, and then verified by GPS circuitry of first device 32(a) making sure that it is within a maximum tolerance (e.g., 15 feet, or the maximum resolution of a typical retail GPS system) of the original location. Due to the 20 cm distance limit of NFC, it is known that the first device 32(a) and the second device 32(b) are in close proximity, since at the time of step 110, they were within 20 cm of each other. In some embodiments, other location measurement techniques are used. The short window of time tends to ensure that second device 32(b) is not attempting to re-use an old ID assertion 54 intercepted from a previous ID authentication transaction between other parties.

In other embodiments, we can rely on the fact that both the first device 32(a) and the second device 32(b) may be privy to information which is not expected to be known to any third party in order to verify the particular contextual relationship within step 140. As an example, in sub-step 146, trust broker program 34 accomplishes verification of the particular contextual relationship by verifying that the second device 32(b) is in possession of a recording of a conversation communicated between the first and second devices 32(a), 32(b). Thus, if users of the first device 32(a) and the second device 32(b) conduct a telephone conversation with each other using these devices 32, the first device 32(a) and the second device 32(b) may each record the same conversation in a substantially similar way. Thus, voice processing and hashing techniques can be used to construct the same hash on both devices 32, the hash not being known to any other party. Thus, when second device 32(b) requests an ID assertion 54 from trusted authority 44(b), the second device 32(b) can request that the ID assertion 54 be made conditional on possession of the hash. Since only first device 32(a) and second device 32(b) (and, temporarily, trusted authority 44(b)) are in possession of the hash, when first device 32(a) receives the ID assertion 54, it can be sure that the signed assertion was requested by the second device 32(b), since it is conditional on the hash that is only known to those parties.

In step 150, trust broker program 34 validates the identifier of entity 33 from the ID assertion 54 as properly identifying the entity 33, since the particular contextual relationship has been satisfied.

In some embodiments, in which first device 32(a) is a mobile device having a UI 76 and the first device 32(a) in the possession of a user 77, in optional step 160, trust broker program 34 displays an identification of the identity providing trusted authority 44(b) as well as the identifier identifying the entity 33 on the UI 76.

In some embodiments, after performing step 150, trust broker program 34 also validates an attribute asserted within attribution assertion 58 by verifying that the ID-based condition 59 is satisfied by the identity validated in step 150. In some embodiments, in optional step 162, trust broker program 34 also displays the validated attribute of the entity 33 on the UI 76 at the same time as step 160.

In some embodiments, after performing step 152, trust broker program 34 also validates an action authorization asserted within authorization assertion 60 by verifying that the attribute-based condition 61 is satisfied by the attribute validated in step 152. In some embodiments, in optional step 164, trust broker program 34 also displays the validated action authorization of the entity 33 on the UI 76 at the same time as step 160. In other embodiments, in which first device 32(a) is a stationary device having access control circuitry 78 connected to an access-controlled resource 79, in optional step 166, trust broker program 34 directs access control circuitry 78 to unblock access to access-controlled resource 79, e.g., by unlocking a doorway.

Figure 4:
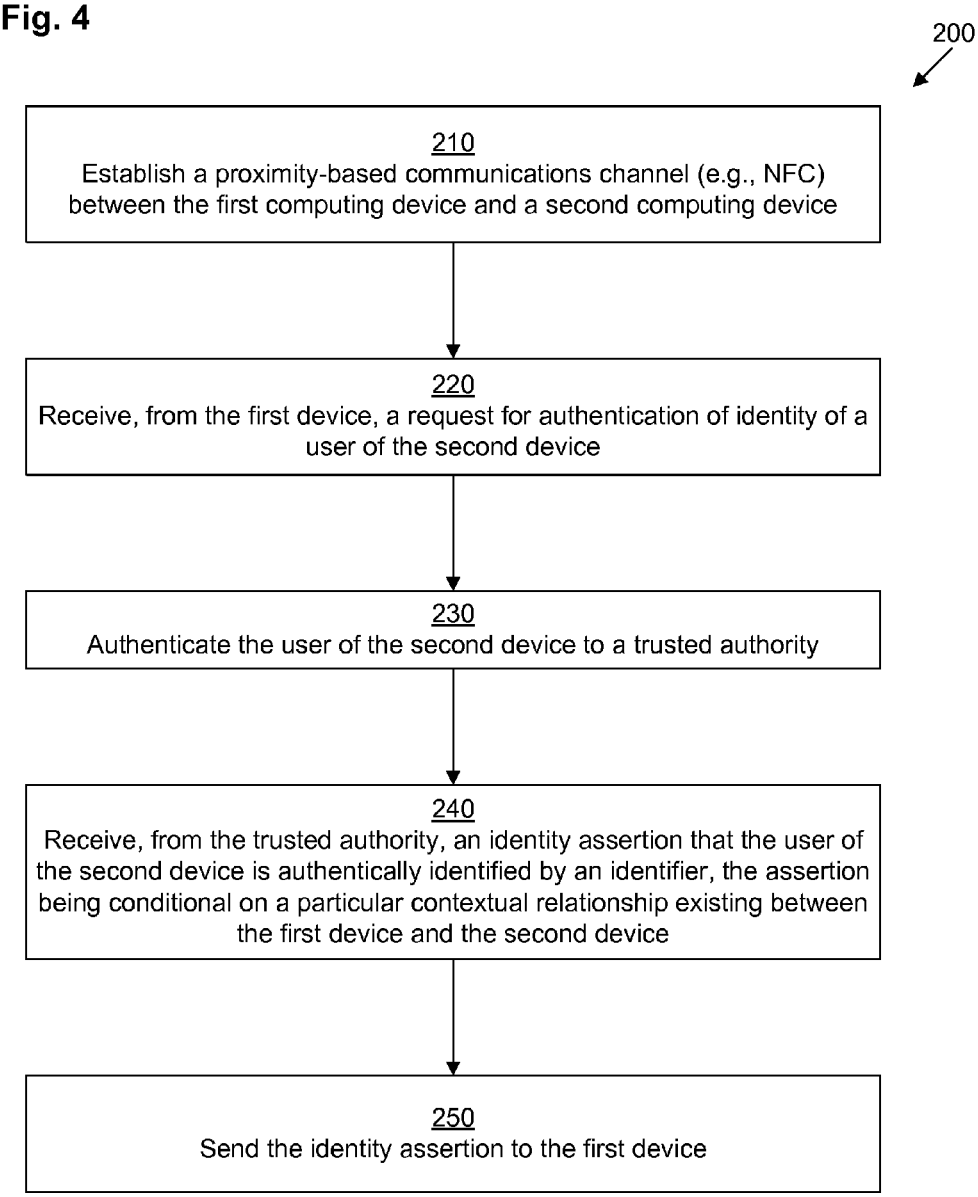
FIG. 4 illustrates an example method according to various embodiments.

Having described method 100 performed by trust broker program 34 of first device 32(a), a method 200 performed by trust broker program 34 of second device 32(b) is now described with respect to FIG. 4.

FIG. 4 depicts an example method 200 performed by a second device 32(b). Method 200 is performed by processor 78 of second device 32(b) as it executes trust broker program 34, however, as shorthand, this execution will henceforth be described as being performed by trust broker program 34.

In step 210 (performed in conjunction with step 110 by first device 32(a)), second device 32(a) establishes proximity-based communications channel 36 (e.g., an NFC channel)

between first device 32(a) and second device 32(b). The proximity of the devices 32 required to maintain the proximity-based communications channel 36 ensures both that the devices 32 are collocated within a small geographic area (e.g., within 20 cm of each other), and also reduces the likelihood that a third party is eavesdropping on the unsecured channel.

In step 220, trust broker program 34 receives, from the first device 32(a), ID request 51 for authentication of the identity of entity 33 in control of second device 32(b). As mentioned above in connection with step 120, this can be done either via secured NFC channel 36 or secured high-bandwidth communications channel 38.

In step 230, trust broker program 34 authenticates to its associated ID Provider, which, as depicted, is remote trusted authority 44(b) by sending authentication request 52. As mentioned previously, this may include authentication by password, biometric data, or a knowledge-based technique. In some embodiments, instead of authenticating to remote trusted authority 44(b), trust broker program 34 authenticates to local trusted authority application 92, as described previously.

In response, in step 240, trust broker program 34 receives authentication response message 53, which contains local ID assertion 86, the truth of which is conditional on a particular contextual relationship existing between the first device 32(a) and the second device 32(b), such as proximity-based condition 87. In some embodiments, trust broker program 34 also sends and receives messages 62-65 in order to receive other local assertions 85. In other embodiments, other local assertions 85 (e.g., local attribute assertions 88 and local authorization assertions 90) may already be locally-stored in memory 80 of second device 32(b).

In response, in step 250, second device 32(b) sends ID response 56, which contains local ID assertion 86 (and, optionally, one or more of local attribute assertions 88 and authorization assertions 90) to first device 32(a), which then stores the received assertions as foreign assertions 84 in memory 80 of first device 32(a).

In some embodiments, certain steps of method 200 may actually be performed by first device 32(a) as part of a mutual authentication procedure. Thus, steps 220-250 may also be performed by first device 32(a) rather than just be second device 32(b) (in which case, second device 32(b) also performs steps 12-150 of method 100 in conjunction with steps 220-250 performed by first device 32(a)). In such a situation, when first device 32(a) receives the reciprocal authentication request from second device 32(b) for authentication of the identity of user 77 of first device 32(a) (step 220), in some embodiments, first device 32(a) also receives secondary key, L, 83 from second device 32(b) for first device 32(a) to use in connection with its authentication to trusted authority 44(a) (or, in some embodiments, local trusted authority application 92) so that secondary key, L, 83 is established as part of the local proximity-based condition 87 of first device 32(a), which will ultimately be received by second device 32(b) as its foreign proximity-based condition 55.

Thus, various techniques have been provided for identifying entities 33, 77 and validating their credentials using one or more mobile devices and a proximity-based communications channel 36 in order to verify an identity assertion 54 made by a trusted authority 44(b) conditional on a proximity-based condition 55. In some embodiments, the trusted authority 44(b) authenticates the entity 33 using a knowledge-based or biometric technique prior to making an assertion. In some embodiments, the trusted authority 44(b) cryptographically signs the assertion 54 to avoid tampering. In some embodiments, the trusted authority 44(b) or another trusted authority 44(c), 44(n) may also make an attribute or authorization assertion 58, 60 conditional on the identity of the entity 33 using similar techniques.

While various embodiments of the present disclosure have been particularly shown and described, it will be understood by those skilled in the art that various changes in form and details may be made therein without departing from the spirit and scope of the present disclosure as defined by the appended claims.

It should be understood that although various embodiments have been described as being methods, software embodying these methods is also included. Thus, one embodiment includes a tangible non-transitory computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a first computing device, the method comprising:
 establishing a proximity-based communications channel between the first computing device and a second computing device, one of the first device and the second device being a mobile device;
 sending a request for authentication of identity of a remote entity from the first device to the second device, the remote entity being in possession of the second device;
 receiving, at the first device, from the second device, an identity assertion that the remote entity is authentically identified by an identifier, the identity assertion's truth being conditional on a particular contextual relationship existing between the first device and the second device;
 verifying, at the first device, that the particular contextual relationship is satisfied; and
 in response to verifying, validating the identifier of the remote entity.

2. The method of claim 1 wherein establishing the proximity-based communications channel includes establishing a near-field communications channel when the first device and the second device are within 20 centimeters of each other.

3. The method of claim 2 wherein:
 sending the request includes sending the request from the first device to the second device over the near-field communications channel when the first device and the second device are within 20 centimeters of each other; and
 receiving the identity assertion that the remote entity is authentically identified by the identifier, the identity assertion's truth being conditional on the particular contextual relationship, includes receiving the identity assertion over the near-field communications channel when the first device and the second device are within 20 centimeters of each other.

4. The method of claim 2 wherein:
the method further comprises:
engaging in a key agreement procedure across the near-field communications channel to share a dynamically randomly generated cryptographic session key between the first device and the second device; and
establishing a high bandwidth secured connection between the first device and the second device using the session key as a cryptographic key for the secured connection;
sending the request includes sending the request over the high bandwidth secured connection; and
receiving the identity assertion that the remote entity is authentically identified by the identifier includes receiving the identity assertion over the high bandwidth secured connection from the second device.

5. The method of claim 4 wherein receiving the identity assertion that the remote entity is authentically identified by the identifier includes:
receiving, at the first device, the identity assertion within a message, the message being cryptographically signed by a trusted authority; and
verifying, at the first device, using a public key of the trusted authority, that the message has been signed by the trusted authority.

6. The method of claim 5 wherein:
the particular contextual relationship existing between the first device and the second device is established by a requirement that the second device be in possession of the session key, the identity assertion indicating that the trusted authority has knowledge of the session key; and
verifying that the particular contextual relationship is satisfied includes verifying, at the first device, that the trusted authority has generated the identity assertion with knowledge of the session key.

7. The method of claim 5 wherein:
the particular contextual relationship existing between the first device and the second device is established by a requirement that the second device be located at a specific location within a window of time, the identity assertion indicating that the trusted authority has knowledge of the specific location; and
verifying that the particular contextual relationship is satisfied includes verifying, at the first device, within the window of time, that the trusted authority has generated the identity assertion with knowledge that the second device is located at the specific location.

8. The method of claim 5 wherein:
the particular contextual relationship existing between the first device and the second device is established by a requirement that the second device be in possession of a recording of a conversation communicated between the first device and the second device, the identity assertion indicating that the trusted authority has knowledge of the conversation; and
verifying that the particular contextual relationship is satisfied includes verifying, at the first device, that the trusted authority has generated the identity assertion with knowledge that the second device is in possession of the recording of the conversation.

9. The method of claim 5 wherein:
the first device is a mobile device having a user interface; and
the method further includes, in response to validating the identifier of the remote entity, displaying, to a user of the first device via the user interface:
an identification of the trusted authority; and
the identifier of the remote entity.

10. The method of claim 9 wherein the method further comprises:
receiving, at the first device, an attribute assertion that the remote entity possesses an attribute, the attribute assertion's truth being conditional on the identifier authentically identifying the remote entity;
in response to validating the identifier of the remote entity, validating that the remote entity possesses the attribute;
the method further includes, in response to validating the identifier of the remote entity, displaying, to the user of the first device via the user interface, a description of the attribute.

11. The method of claim 10 wherein receiving the attribute assertion includes receiving, at the first device, the attribute assertion within the message signed by the trusted authority.

12. The method of claim 10 wherein receiving the attribute assertion includes:
receiving, at the first device, the attribute assertion within another message, the other message being cryptographically signed by another trusted authority; and
verifying, at the first device, using a public key of the other trusted authority, that the other message has been signed by the other trusted authority.

13. The method of claim 9 wherein the method further comprises:
receiving, at the first device, an attribute assertion that the remote entity possesses an attribute, the attribute assertion's truth being conditional on the identifier authentically identifying the remote entity;
receiving, at the first device, an authorization assertion that the remote entity is authorized to perform an action, the authorization assertion's truth being conditional on the remote entity possessing the attribute;
in response to validating the identifier of the remote entity, validating that the remote entity possesses the attribute and that the remote entity is authorized to perform the action; and
in response to validating that the remote entity is authorized to perform the action, displaying, to the user of the first device via the user interface an indication that the remote entity is authorized to perform the action.

14. The method of claim 9 wherein:
the second device is a second mobile device;
the remote entity is a user of the second mobile device;
the method further includes receiving, at the first device, from the second device, a request for authentication of identity of the user of the first device;
authenticating the user of the first device to a second trusted authority;
receiving, at the first device, from the second trusted authority, another identity assertion that the user of the first device is authentically identified by another identifier, the other identity assertion's truth being conditional on the particular contextual relationship existing between the first device and the second device;
sending the other identity assertion from the first device to the second device.

15. The method of claim 5 wherein the message is an XML-based message.

16. The method of claim 1 wherein
the second device is a mobile device;
the remote entity is a user of the second mobile device;
the first device is a stationary device connected to an access-controlled resource, access to the access-controlled resource being blocked by default;
the method further comprises:
  receiving, at the first device, an attribute assertion that the remote entity possesses an attribute, the attribute assertion's truth being conditional on the identifier authentically identifying the remote entity;
  receiving, at the first device, an authorization assertion that the user of the second mobile device is authorized to access the access-controlled resource, the authorization assertion's truth being conditional on the remote entity possessing the attribute;
  the method further includes, in response to validating the identifier of the remote entity, validating that the user of the second mobile device possesses the attribute and that the user of the second mobile device is authorized to access the access-controlled resource; and
  in response to validating that the user of the second mobile device is authorized to access the access-controlled resource, unblocking access to the access-controlled resource.

17. The method of claim 1 wherein:
establishing the proximity-based communications channel includes establishing a near-field communications channel when the first device and the second device are proximate to each other;
the method further comprises:
  engaging in a key agreement procedure across the near-field communications channel to share a dynamically randomly generated cryptographic session key between the first device and the second device; and
  establishing a high bandwidth secured connection between the first device and the second device using the session key as a cryptographic key for the secured connection;
sending the request includes sending the request over the high bandwidth secured connection; and
receiving the identity assertion that the remote entity is authentically identified by the identifier includes receiving the identity assertion over the high bandwidth secured connection from the second device.

18. The method of claim 15 wherein the XML-based message is a message in conformance with the Security Assertion Markup Language.

19. A computer program product comprising a non-transitory computer-readable storage medium, the non-transitory computer-readable storage medium storing instructions, which, when performed by a first computing device, cause the first computing device to:
  establish a proximity-based communications channel between the first computing device and a second computing device, one of the first device and the second device being a mobile device;
  send a request for authentication of identity of a remote entity from the first device to the second device, the remote entity being in possession of the second device;
  receive, at the first device, from the second device, an identity assertion that the remote entity is authentically identified by an identifier, the identity assertion's truth being conditional on a particular contextual relationship existing between the first device and the second device;
  verify, at the first device, that the particular contextual relationship is satisfied; and
  in response to verifying, validate the identifier of the remote entity.

\* \* \* \* \*